US011974351B2

(12) United States Patent
Dees

(10) Patent No.: US 11,974,351 B2
(45) Date of Patent: Apr. 30, 2024

(54) DEVICE FOR WIRELESS COMMUNICATION WITH OTHER DEVICES

(71) Applicant: KONINKLIJKE PHILIPS N.V., Eindhoven (NL)

(72) Inventor: Walter Dees, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 18/130,117

(22) Filed: Apr. 3, 2023

(65) Prior Publication Data

US 2023/0239673 A1  Jul. 27, 2023

Related U.S. Application Data

(63) Continuation of application No. 17/056,775, filed as application No. PCT/EP2019/063210 on May 22, 2019, now Pat. No. 11,632,666.

(30) Foreign Application Priority Data

May 24, 2018  (EP) .................................... 18174135

(51) Int. Cl.
*H04W 8/00*  (2009.01)
*H04W 12/06*  (2021.01)
(Continued)

(52) U.S. Cl.
CPC ............ *H04W 8/005* (2013.01); *H04W 12/06* (2013.01); *H04W 12/66* (2021.01);
(Continued)

(58) Field of Classification Search
CPC ..... H04W 8/005; H04W 84/18; H04W 76/14; H04W 48/16; H04W 84/12; H04W 4/80;
(Continued)

(56) References Cited

U.S. PATENT DOCUMENTS 7,706,344 B2  4/2010  Kobayashi
8,571,473 B2  10/2013  Lee
(Continued)

FOREIGN PATENT DOCUMENTS

| JP | 2016025598 A | 2/2016 |
|---|---|---|
| RU | 2384981 C2 | 3/2010 |
| WO | 2016191258 A1 | 12/2016 |

OTHER PUBLICATIONS

Neighbor Awareness Networking Technical Specification (Oct. 20, 2017).
(Continued)

*Primary Examiner* — Kwasi Karikari

(57) ABSTRACT

A device (110) arranged for wireless communication (130) according to a communication protocol has a processor (112) to execute a connection sequence according to a discovery protocol. The connection sequence comprises determining a current cluster identity and a current discovery window timing used by the device. Next, at least one other device (120,120') within wireless range is detected, while further determining a detected cluster identity and a detected discovery window timing of the detected other device. Then it is detected whether the detected device is operating in a different cluster than the device by comparing the current cluster identity with the detected cluster identity or comparing the current discovery window timing with the detected discovery window timing. Finally, upon detecting said different cluster, a security process is executed, which may warn the user or abort the connection sequence. Thereby, a malicious device trying to manipulate the connection sequence is detected.

19 Claims, 4 Drawing Sheets

(51) Int. Cl.
*H04W 12/60* (2021.01)
*H04W 56/00* (2009.01)
*H04W 76/11* (2018.01)
*H04W 84/18* (2009.01)

(52) U.S. Cl.
CPC .......... *H04W 56/001* (2013.01); *H04W 76/11* (2018.02); *H04W 84/18* (2013.01)

(58) Field of Classification Search
CPC . H04W 72/0446; H04W 4/70; H04W 40/246; H04W 56/0015; H04W 88/06; H04W 40/248; H04W 76/10; H04W 88/02; H04W 56/001; H04W 56/002; H04W 12/06; H04W 40/02; H04W 4/023; H04W 40/10; H04W 76/15; H04W 40/24; H04W 40/20; H04W 48/18; H04W 4/08; H04W 52/0209; H04W 40/005; H04W 24/02; H04W 48/10; H04W 40/12; H04W 72/56; H04W 16/18; H04W 72/542; H04W 60/00; H04W 40/244; H04W 4/21; H04W 72/121; H04W 74/04; H04W 40/32; H04W 56/0025; H04W 12/062; H04W 56/0095; H04W 48/02; H04W 12/03; H04W 36/32; H04W 12/125; H04W 52/46; H04W 36/26; H04W 12/108; H04W 12/12; H04W 12/55; H04W 12/00; H04W 16/20; H04W 12/121; H04W 12/082; H04W 36/0038; H04W 12/086; H04W 12/76; H04W 48/00; H04W 28/0862; H04W 28/0892; H04W 28/0917; H04W 28/22; H04W 76/00
See application file for complete search history.

(56) References Cited

U.S. PATENT DOCUMENTS

| | | | |
|---|---|---|---|
| 8,917,716 B2 | 12/2014 | Tran | |
| 9,642,136 B2 | 5/2017 | Du | |
| 9,883,472 B1 | 1/2018 | Tamhane | |
| 2014/0080481 A1* | 3/2014 | Abraham | H04W 8/005 455/434 |
| 2015/0188935 A1* | 7/2015 | Vasseur | H04W 12/12 726/23 |
| 2016/0219422 A1* | 7/2016 | Segev | H04W 52/383 |
| 2016/0286388 A1 | 9/2016 | Marin et al. | |
| 2017/0027004 A1 | 1/2017 | Lu et al. | |
| 2017/0111849 A1* | 4/2017 | Park | H04W 48/16 |
| 2017/0353381 A1 | 12/2017 | Qi et al. | |
| 2018/0035419 A1 | 2/2018 | Beattie, Jr. | |
| 2018/0049013 A1 | 2/2018 | Lee | |
| 2018/0152828 A1 | 5/2018 | Kasslin et al. | |
| 2018/0335514 A1 | 11/2018 | Dees | |
| 2020/0128595 A1 | 4/2020 | Dees | |

OTHER PUBLICATIONS

IEEE Standard for Information Technology Part 11.
International Search Report and Written Opinion From PCT/EP2019/063210 dated Jun. 27, 2019.

* cited by examiner

DEVICE FOR WIRELESS COMMUNICATION WITH OTHER DEVICES

CROSS REFERENCE TO RELATED APPLICATION

The present application is a continuation of co-pending U.S. patent application Ser. No. 17/056,775, filed Nov. 19, 2020, which is the U.S. National Phase application under 35 U.S.C. § 371 of International Application No. PCT/EP2019/063210 filed May 22, 2019, which claims the benefit of International Application No. EP 18174135.6 filed May 24, 2018. These applications are hereby incorporated by reference herein.

FIELD OF THE INVENTION

The invention relates to a device arranged for wireless communication with other devices. The device comprises a transceiver for wireless communication according to a communication protocol including a discovery protocol, and a processor arranged to execute a connection sequence to discover at least one other device within wireless range according to the discovery protocol and to connect to a discovered device for exchanging data. The communication protocol may require that connected devices operate in a respective cluster having a cluster master applying a master rank and a synchronization timing, the cluster having a respective cluster identity and providing a respective discovery window at a respective discovery window timing.

The present invention relates to the field of short-range wireless communication systems, e.g. indoor communication using mobile devices, and more in particular provides devices and methods for setting up peer-to-peer wireless connections as well as corresponding computer program products.

BACKGROUND OF THE INVENTION

Reference document [1] "Neighbor Awareness Networking, Technical Specification Version 2.0", published by Wi-Fi Alliance, dated 2017 Oct. 20 is a technical specification of the Wi-Fi Alliance for a communication protocol for Neighbor Awareness Networking (NAN). The specification defines architecture, protocols, and functionality for interoperability of Wi-Fi Aware-certified devices. NAN allows peer-to-peer devices within wireless range to discover each other and connect to each other to exchange data (e.g. pictures, movies, documents, personal data, sensor data, service specific protocol data, etc.) without requiring an intermediate access point. In a Wi-Fi Aware system, the discovery and data connections are based on a distributed timeslot synchronization mechanism, whereby a group of devices automatically form clusters and a so-called NAN cluster master determines a cluster identity and a synchronization of time windows (called discovery windows) in which devices can discover each other.

Currently the security of such data channels requires knowledge of a pre-shared secret, e.g. based on a passphrase entered/displayed on peer device, or some other out-of-band mechanism. Such a mechanism is inconvenient, so in order to allow more flexibility, other security mechanisms are being explored. An example of such mechanism is to exchange a public key during performing distance measurement and use that public key in consecutive secure connection setup steps, as described in WO2017089247 "System for verifying distance measurements".

SUMMARY OF THE INVENTION

The above examples provide some security during setting up a wireless connection between a device and some other device. However, there is a risk that a malicious device intervenes or manipulates messages during setting up the connection and may get access to the exchanged data.

It is an object of the invention to provide a system for reliably setting up a secure wireless connection between a device and a further device, when the further device is within wireless range.

For this purpose, devices and methods are provided as defined in the appended claims. According to an aspect of the invention a device is provided as defined in claim 1. According to a further aspect of the invention there is provided a method as defined in claim 14. According to a further aspect of the invention there is provided a computer program product downloadable from a network and/or stored on a computer-readable medium and/or microprocessor-executable medium, the product comprising program code instructions for implementing the above method when executed on a computer.

In the current context, a device (further called device D) may be any electronic device having the capability for setting up a connection to a further device (also called device E) via wireless communication according to a communication protocol including a discovery protocol.

Within the context of this document the device D and further devices available for setting up said connection are considered to be peers, i.e. both being arranged for setting up a secure wireless connection according to said communication protocol without one of the devices initially having the role of a master, while each of the devices is equipped for using wireless communication and may have an appropriate user interface. The device D may be a stationary device like a PC or an access point or a wireless docking station or a wireless USB hub, or a wireless video or AV monitor, but the device D may also be a portable device like a laptop or a mobile device like a smartphone. The further devices that participate in said wireless communication as discussed in this document may be similar to device D and have similar units like a processor and transceiver for wireless communication according to the communication protocol.

The device D has a transceiver for wireless communication according to the communication protocol and a processor arranged to execute a connection sequence to discover at least one other device within wireless range. Each device is arranged to communicate according to the wireless communication protocol, and to participate in a discovery protocol to set up a connection and exchange data. The processor of the device is arranged to execute according to the discovery protocol to connect to a discovered device for exchanging data. The connection sequence may be arranged to execute any action related to managing connections.

The communication protocol may require that connected devices operate in a respective cluster having a cluster master applying a master rank and a synchronization timing, the cluster having a respective cluster identity and providing a respective discovery window at a respective discovery window timing. An example of such a communication protocol and discovery protocol is described in ref [1] NAN.

The above features have the effect that the connection sequence determines a current cluster identity and a current discovery window timing as used by the device itself. When detecting at least one other device within wireless range, for each detected device a detected cluster identity and a detected discovery window timing of the detected other device are determined. Subsequently, it is detected whether the detected other device is operating in a different cluster than the device D by comparing the current cluster identity with the detected cluster identity or comparing the current discovery window timing with the detected discovery window timing. Upon detecting said different cluster, the connection sequence is interrupted and a security process is executed. The security process may execute additional steps to assure that a connection with the detected device is intended, and, if so, further execute the connection sequence, or otherwise may abort the connection sequence.

The invention is based, inter alia, on the following insight. Given the way in which discovery mechanisms like in Wi-Fi Aware operate, there is a possibility that a malicious device (further called device M) could become the master of a NAN cluster and force the discovery windows of one or more devices in vicinity to become synchronized in such a non-overlapping way that they may not be able to discover each other anymore through normal operation, e.g. by sending/receiving NAN synchronization beacons during the discovery window. If so, device M may present itself for setting up a connection instead of an intended device E. Additionally, the malicious device may have a way to manipulate distance measurements of the NAN ranging mechanism, e.g. by sending wrong FTM time stamps. So even in case the user of devices D and E holds both devices in his hands, and device D determines that only a single device is in wireless range and even in close vicinity to device D (e.g. by using the NAN ranging mechanism to determine the distance between device D and the devices discovered by device D is not greater than 1 meter), it is not sure that device D actually would connect to device E, and not to a malicious device M that has taken synchronization control of device E. So, when a different cluster is detected, the inventors have seen that this is an indication that a malicious device may be present. So, upon such detection, the enhanced device D executes said security process.

In an embodiment, the processor is arranged to detect whether the detected device is operating in a different cluster by detecting changes to the discovery timing or the cluster master rank, and performing the security process if the number of changes during a predetermined period is above a predetermined threshold value. Advantageously, a malicious device manipulating the discovery timing and/or the cluster master rank will be detected.

In an embodiment, the processor is arranged to execute the security process comprising detecting a further device within wireless range, establishing whether the detected other device and the further device have one or more overlapping characteristics, and, upon establishing that said devices do not have said characteristics, further executing the connection sequence. So overlap may be detected in combination with otherwise executed steps in the security process. Advantageously, by combining the information on overlap with, for example, detected differences in the discovery window timing, a malicious device trying to impersonate another device may be detected. Also, when no overlapping characteristics are present, a false alarm is prevented.

A method according to the invention may be implemented on a computer as a computer implemented method, or in dedicated hardware, or in a combination of both. Executable code for a method according to the invention may be stored on a computer program product. Examples of computer program products include memory devices such as a memory stick, optical storage devices such as an optical disc, integrated circuits, servers, online software, etc. The computer program product may comprise non-transitory program code means stored on a computer readable medium for performing a method according to the invention when said program product is executed on a computer. In an embodiment, the computer program comprises computer program code means adapted to perform all the steps or stages of a method according to the invention when the computer program is run on a computer. Preferably, the computer program is embodied on a computer readable medium. There is provided a computer program product downloadable from a network and/or stored on a computer-readable medium and/or microprocessor-executable medium, the product comprising program code instructions for implementing a method as described above when executed on a computer.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

Further preferred embodiments of the devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
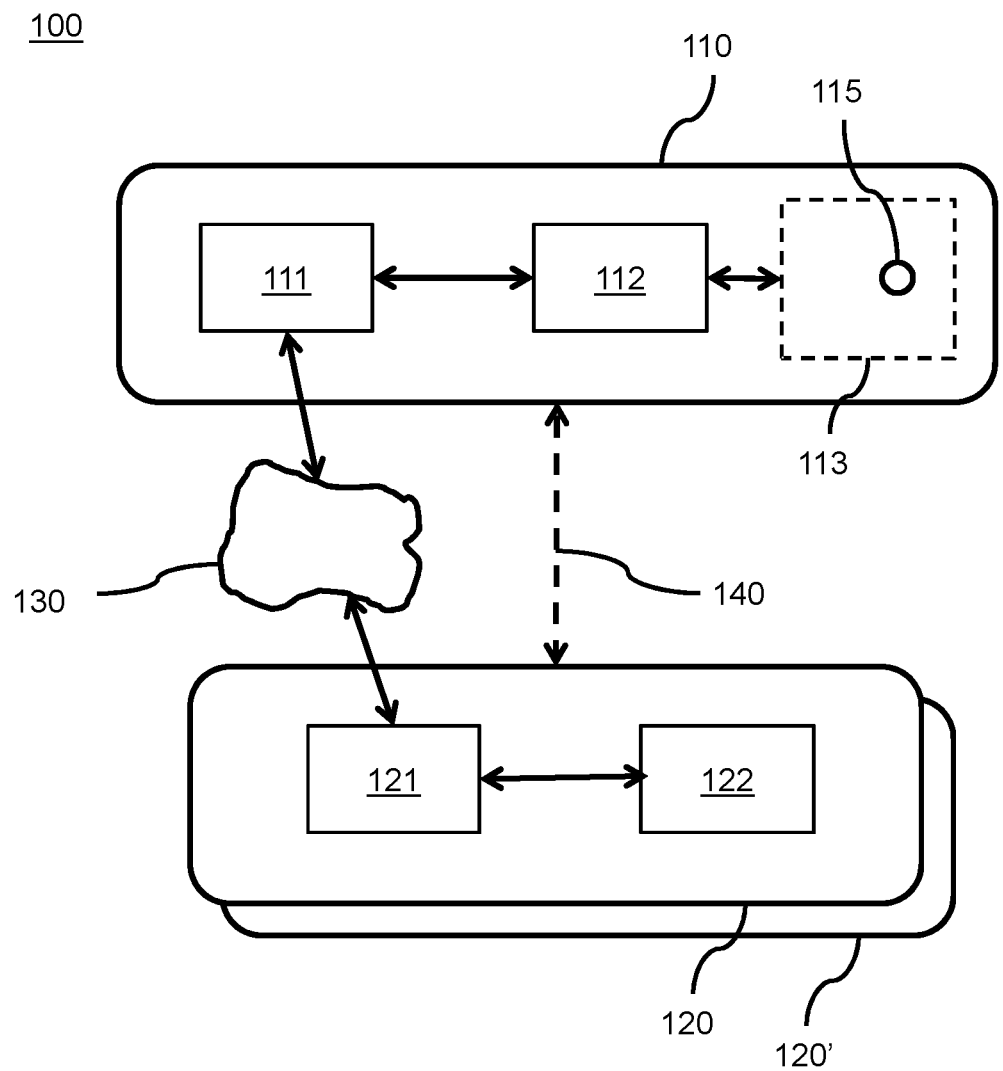
FIG. 1 shows devices for wireless communication and setting up a connection according to a communication protocol including a discovery protocol.

The main elements in the enhanced system for wireless communication according to a communication protocol including a discovery protocol are as follows. The communication protocol may, for example, be an embodiment of Wi-Fi as described in NAN refill, or a similar protocol for wireless communication. The protocol may require that connected devices operate in a respective cluster having a cluster master applying a master rank and a synchronization timing, the cluster having a respective cluster identity and providing a respective discovery window at a respective discovery window timing. A Wi-Fi Aware device D is arranged for discovering one or more devices $X_0 \ldots X_n$. Such other device $X_i$ is any device within wireless range to which device D has not been paired. Device D performs a connection sequence which involves the following actions. First at least one other device ($X_j$) within wireless range is detected. Subsequently, a current cluster identity and a current discovery window timing as used by the device D are determined. Also, for each of the detected other devices, device D performs the following actions. First it determines a detected cluster identity and a detected discovery window timing of the detected other device. Then, device D detects whether the detected other device is operating in a different cluster than the device by comparing the current cluster identity with the detected cluster identity or comparing the current discovery window timing with the detected discovery window timing. Finally, upon detecting said different cluster, a security process is executed.

In the security process, device D may display a warning message to the user and/or abort the connection setup procedure if any other detected device $X_j$ ($0 \leq j \leq n$), found within wireless range of device D, is operating a different cluster or is using a different Discovery Window (DW) timing than device D and/or device $X_i$.

The above enhanced device D may, for example, detect the following situation. A man-in-the-middle device M operates in sync with both device D and a further device E, and manipulates the discovery of device E. Device E may be manipulated to operate in a cluster controlled by device M. For example, in order to keep device E in sync, device M may move it towards, and subsequently keep it in, a Non-Master Non-Sync state in which it will stop sending its own NAN synchronization beacon frames. Device M may keep sending NAN synchronization beacon frames towards device E. Device D may listen for such frames to detect said different cluster.

In an exemplary embodiment, device D may determine that device $X_j$ has one or more similar characteristics with device X, before displaying a warning message to the user and/or aborting the connection setup procedure. The security process does not display a warning message and does not abort the connection setup procedure if none of the other discovered devices $X_k$ ($0 \leq k \leq n$, $k \neq i$) has one or more overlapping characteristics.

In the discovery protocol, the connection sequence and/or the security protocol a distance between device D and other devices may be determined using a ranging protocol known as such. For example, a system for distance measurement is recently developed in a version of the protocol for wireless communication defined in IEEE 802.11-2016. The new version comprises a ranging protocol for determining a distance between two devices and allows for accurate distance measurement and determining location of devices up to 1 meter or even lower resolution. The ranging protocol, called Fine Timing Measurement procedure (FTM), is defined in [reference 2] IEEE 802.11-2016 Chapter 10.24.6, and accurately measures the Round-Trip Time (RTT) of the signal using measurement messages, and derives the distance based on the measured travelling time of the messages. In such a wireless ranging protocol messages are exchanged and time intervals are determined between sending and/or receiving such messages to determine a round trip time. The distance is determined based on a travelling time of the messages between the first device and the second device. A further example, also taking into account actions of malicious devices, is described in WO2017089247 "System for verifying distance measurements".

Setting up, modifying or terminating wireless connections may occur in various application contexts, for example between mobile phones or during docking a mobile device to a host. The proposed system achieves controlling setting up a wireless connection between two devices, such that the user is certain that the right devices connect. Although the further examples usually relate a NAN system as defined in [1], the system may also apply to other wireless devices with a wireless connection function, such as Miracast devices.

FIG. 1 shows devices for wireless communication and setting up a connection according to a communication protocol including a discovery protocol. A system 100 for wireless communication comprises a device 110, called device D, and further devices 120, 120, the devices being physically apart at a distance 140. The further devices 120' are schematically indicated and are similar to the device D, and are constituting peers with respect to the wireless communication, as elucidated above. The device D has a transceiver 111 and a processor 112. Likewise, each other device may have a transceiver 121 and a processor 122. Each device is equipped for wireless communication, as schematically indicated by shape 130 and arrows which connect the transceivers 111, 121. The devices are arranged for wireless communication according to a communication protocol.

In FIG. 1, device D also may have a user interface 113 having a user input element 115. For example, the user input element may comprise a touch screen, various buttons, a mouse or touch pad, etc. Buttons may be traditional physical buttons, touch sensors, or virtual buttons, e.g. on a touch screen or icons to be activated via a mouse. The user interface may also be a remote user interface. The processor 112 is arranged to execute a connection sequence according to the wireless communication protocol to discover at least one other device within wireless range according to the discovery protocol and to connect to a discovered device for exchanging data.

The communication protocol requires that connected devices operate in a respective cluster having a cluster master applying a master rank and a synchronization timing, the cluster having a respective cluster identity and providing a respective discovery window at a respective discovery window timing. An example of such communication protocol is described in ref [1].

The connection sequence involves a sequence of actions. First, by communicating to respective devices in wireless communication range, at least one other device ($X_j$) within wireless range is detected. Subsequently, a current cluster identity and a current discovery window timing as used by the device D are determined. Also, for each of the detected other devices, device D performs the following actions. First it determines a detected cluster identity and a detected discovery window timing of the detected other device. Then, device D detects whether the detected other device is operating in a different cluster than the device by comparing the current cluster identity with the detected cluster identity or comparing the current discovery window timing with the detected discovery window timing. Finally, upon detecting said different cluster, a security process is executed.

In the security process, device D may display a warning message to the user if any other detected device $X_j$ ($0 \leq j \leq n$), found within wireless range of device D, which is operating a different cluster or is using a different Discovery Window (DW) timing than device D and/or device Xi. Alternatively, upon detecting said different cluster, device D may immediately abort the connection setup procedure.

In an embodiment, the processor in device D is arranged to execute the security process comprising requesting a user input representing a confirmation to continue connecting, and upon receiving said confirmation, further executing the connection sequence. However, if the user does not confirm the intended connection upon said displaying of the warning message and/or requesting the confirmation, device D may abort the connection setup procedure, or may execute additional security steps, e.g. requiring a passphrase. In an embodiment, the processor in device D is arranged to detect whether the detected device is operating in a different cluster as follows. The processor may first detect changes to the discovery timing, and/or changes in the cluster master rank. Such detection may be performed for a predetermined period, or the number of changes may be normalized for a predetermined period, e.g. by calculating an average. Subsequently, the security process is performed if the number of changes in said predetermined period is above a predetermined threshold value.

In an embodiment, the processor in device D is arranged to execute the security process comprising detecting a further device (Xi) within wireless range. So, in addition to the detected other device, at least one further device is detected, now called Xi. Next the processor establishes whether the detected other device and the further device have one or more overlapping characteristics. Upon establishing that said devices do not have said characteristics, the connection sequence is resumed and further executed.

In an embodiment, the processor in device D is arranged to execute the security process including the following steps. First, a discovery message is send during a detected discovery window using a synchronization timing of the detected other device. Then, the processor waits to receive one or more discovery responses from one or more additional devices responding to the discovery message. Subsequently, it is established whether the detected other device and the additional devices have one or more overlapping characteristics. Upon establishing that said devices do not have said characteristics, the connection sequence is resumed and further executed.

In an embodiment, the processor in device D processor is arranged to execute the security process including the following steps. First, a cluster synchronization message is send during a detected discovery window using a master rank that is same or higher than a detected master rank of the detected device. Also, a synchronization timing may be applied that is higher than a detected synchronization time of the detected other device. Then, the processor waits to receive one or more discovery responses from one or more additional devices responding to the cluster synchronization message. Subsequently, it is established whether the detected other device and the additional devices have one or more overlapping characteristics. Upon establishing that said devices do not have said characteristics, the connection sequence is resumed and further executed.

However, in any of the above embodiments, if there are overlapping characteristics, the security process is further executed, e.g. by displaying said warning, requiring a confirmation via user input, or aborting the connection sequence as discussed above. Also, the security process may continue by displaying a further warning, e.g. mentioning the overlapping characteristics, and/or show the additional devices to the user, or abort the current connection sequence, or even break an existing data connection to a device that has been connected earlier. Also, if more than one further device is detected, said actions may be performed for all detected further devices.

In an embodiment, the processor in device D the processor is arranged to execute the security process comprising, upon detecting said different cluster, interrupting the connection sequence until the security process establishes compliance with at least one additional security criterion. The additional security criterion may be a traditional criterion like requesting a password, fingerprint or face identification. The additional criterion is now requested, because said detecting of the different cluster poses an additional risk of breach of security.

In an embodiment, the processor in device D the processor is arranged to execute the security process comprising executing a distance measurement with the detected other device, or with the additional devices mentioned earlier. The devices as shown in FIG. 1 may further be arranged for distance measurement according to a ranging protocol for determining a distance between two devices, for example as mentioned above with reference to ref [2], but other wireless protocols may also be used, such as Bluetooth, when provided with an appropriate ranging protocol based on round trip time measurement, received signal strength, etc. Based on said measured distance or distances, a distance criterion may be applied wherein only devices within a predetermined distance are allowed to connect.

Figure 2:
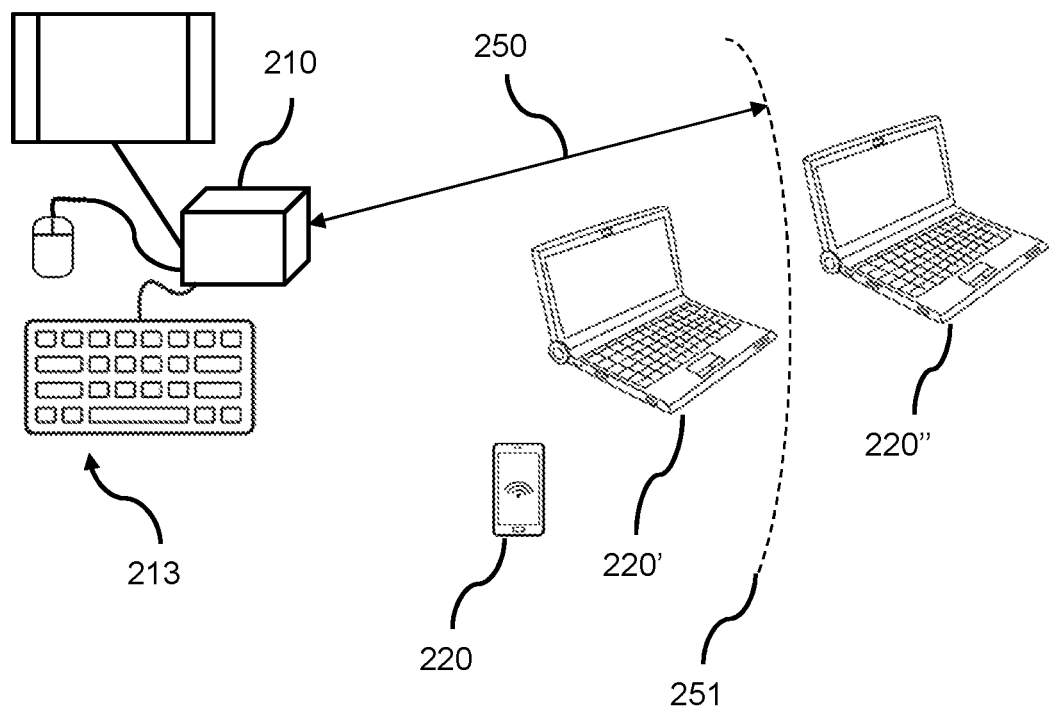
FIG. 2 shows an example of a system having various types of devices for wireless communication in a wireless range.

FIG. 2 shows an example of a system having various types of devices for wireless communication in a wireless range. In the example, a host device W 210, for example a personal computer (PC) is coupled to various peripherals {P1, ... , Pn}. Examples of peripherals include display, keyboard, mouse, webcam, storage device, microphone, audio speakers. A user interface 213 of the host device may have a keyboard, a display, a mouse, a sensitive pad, touch panel, fingerprint sensor or any other sensor or actuator. Device W may host a wireless docking server function capable of enabling the I/O peripherals to be operated by a portable device over a wireless connection as established between device W and the portable device e.g. using any one of the above-mentioned wireless communication protocols.

The Figure also shows multiple devices ID1, ... , Dn}, including a mobile phone 220, and a first laptop 220' and a second laptop 220". The figure also schematically shows a wireless range 250 by an arrow and a dashed boundary 251. The second laptop 220" is outside the wireless range 250. Host device W is further capable of detecting a set of devices {D1, ... , Dn} within the wireless range, which devices are capable of setting up a connection according to a communication protocol including a discovery protocol. A connection can be achieved by exposing a wireless docking capability using a pre-association service discovery mechanism, using for example the Application Service Platform mechanism of performing matching a hash of a service name by a service seeker with an advertiser that hosts a service with that name using e.g. 802.11 Probe Request/Response frames, 802.11 beacon frames, 802.11 GAS Request/Response frames, Bluetooth, NFC, Wi-Fi Aware Service Discovery frames. The service discovery may also be done by using a post-association service discovery mechanism, e.g. using UPnP or mDNS. The pre-association service discovery mechanism typically enables exposing additional information about the service.

In an embodiment of the security process, device W may be arranged to perform a distance measurement with devices {D1, ... , Dn}. Distance measurement can, for example, be achieved by using the 802.11 fine timing measurement (FTM) distance measurement mechanism, e.g. as defined within Wi-Fi Location and Wi-Fi Aware ranging, either by performing the FTM procedure directly between Device W and devices D1 Dn, or by the device W requesting another device (e.g. a nearby WLAN Access Point to which device W is connected) to provide distance/location data of devices D1 ... Dn. The distance may also be determined for example by using iBeacons, or by retrieving GPS data related to D1, Dn that may be exposed by those devices to device W, or any other mechanism that can provide precise indoor positioning (preferably with a minimum accuracy of approximately 1 meter or better). Based on these distance measurements a device W determines which subset S of the set of devices {D1, . . . , Dn} have a distance within a predetermined range R.

Furthermore, in an embodiment of the security process, the processor in device D may be arranged to request an additional security step or authentication step, for example a traditional criterion like requesting a password, a fingerprint or face identification. As an additional security step, the user of device D and/or device E may be required to enter a passphrase as shown to the user of the other device to set up a secure connection. Also, a security step may be performed using a pre-shared key delivered earlier. Also, the security process may comprise authenticating a newly discovered device according to the communication protocol, known as such, e.g. from WO2017089247. Device D may determine which devices are part of an authenticated device list. Also, upon successful authentication of the device, the authenticated device list may be updated. Upon determining that the newly discovered device is part of the authenticated device list, previously established credentials for setting up a connection may be reused.

Furthermore, in an embodiment, the processor in device D may be arranged to signal a higher layer application or service to provide security. Subsequently, the connection sequence as such is further executed without additional security.

In an embodiment, the processor in device D is arranged to execute the security process comprising maintaining a set of devices trusted for connection. Such set contains devices that are to be trusted because earlier security steps have built such trust. Upon detecting that the detected other device is in the set of trusted devices, the connection sequence is resumed and further executed. Optionally in such embodiment, the processor may be arranged to execute the security process comprising establishing whether the detected other device has one or more overlapping characteristics with any further devices in wireless range, and, upon establishing that the detected device does not have said overlapping characteristics, adding the detected other device to the set of trusted devices. So, the set of trusted devices is formed during operational use of device D. Optionally in such embodiment, the processor may be arranged to execute the security process comprising establishing a number of overlapping characteristics of the detected other device with any further devices in wireless range, and, upon establishing that the number of overlapping characteristics does not exceed a predetermined threshold, adding the detected other device to the set of trusted devices. For example, a few overlapping characteristics may be allowed, or some specific overlapping characteristics may be less critical so that they may be tolerated in trusted devices In practice, device D and its operation may be exemplified as follows. Device D may have a Wi-Fi radio, operating according to the Wi-Fi Aware protocol. If a second device X also supports the Wi-Fi Aware protocol, and has just been switched on, or comes within range of device D, device X may offer a service over Wi-Fi Aware (e.g. through the so-called NAN publisher function) that device D wishes to use (i.e. by operating the so-called NAN subscriber function). Then, device D may wish to set up a so-called NAN data path connection to device X upon discovery. In order to do so device D first needs to discover device X and its services. For two devices to discover each other, they have to align their discovery windows, e.g. as specified in Section 3 of the Wi-Fi Aware spec, and send out, respectively receive, service discovery frames. In order to save power, these service discovery frames are typically sent during a discovery windows, e.g. as specified in Sections 3.5 and 4.2 of the Wi-Fi Aware spec.

In detail, service discovery and setting up a connection is done as follows. If device D wishes to use a Wi-Fi Aware service/application (e.g. send a file to another device) on another device, it has to subscribe to one or more Wi-Fi Aware services it is interested in (as specified in Section 4 of Wi-Fi Aware spec). In order to discover which other devices within range support these services, device D either sends out NAN service discovery frames with SUBSCRIBE information to other Wi-Fi Aware devices within the NAN cluster during the discovery window or further NAN service discovery interval, or receives NAN service discovery frames with PUBLISH information. The PUBLISH information includes information such as service name, service instance, MAC address of peer device, and service specific information. The service specific information is likely to include some information understandable for the user to operate the service. In the case of sending a file, this information may include a friendly name of the device, or a user name known within the service, that wishes to send the file or other information to identify which peer device to select if multiple similar service instances are discovered.

In a typical embodiment, device D may have a built-in display or may be connected to a display device to show a list of discovered Wi-Fi Aware service instances offered by Wi-Fi Aware devices within range, and has an input means to allow the user to select the desired Wi-Fi Aware service instance to set up a connection with. Upon selecting the desired service instance, device D will send out a NAN Data Path Request frame to the device offering the desired service instance.

In an embodiment, the display shows a request for the user to enter a passphrase in order to set up a secure connection. In another embodiment, the display shows a passphrase for the user of the other device to enter to set up a secure connection. In yet another embodiment, no passphrase is entered, but the security association is done using a pre-shared key delivered through via some other channel or using another security mechanism. Wi-Fi aware also allows setting up a connection without security, while leaving further security measures to a higher layer service/application to handle the security. It is noted that instead of NAN Data Path connection, device D may set up a Wi-Fi infrastructure, Wi-Fi P2P (a.k.a. Wi-Fi Direct), TDLS, Mesh, IBSS connection, Bluetooth connection or other type of data connection, depending on the supported connection methods as indicated by the NAN connection capability attribute as defined in Section 9.5.5 of the Wi-Fi Aware spec.

In an alternative embodiment, device D may receive a NAN Data Path Request from another device and display information about the incoming request, e.g. service specific info as denoted in the NDP Specific Info or Element Container attributes. So, the user is informed and may provide input to refuse or accept this incoming request. If the incoming request is accepted, the user may be required to enter a passphrase.

As mentioned before, service discovery is typically done during the discovery window the devices are operating in within a NAN cluster. In order to align the timing of the discovery windows, every Wi-Fi Aware device has a NAN master rank, and also sends out and listens for NAN synchronization frames. Wi-Fi Aware devices automatically form clusters, and the cluster master (also called anchor master) determines the timing by using a Timing Synchronization Function (as specified in Section 3 of Wi-Fi Aware spec). If the discovery windows are not aligned, there is a possibility that NAN devices may not discover each other.

In the following section it is explained how a malicious device M may act to manipulate the connection sequence, and how the enhanced device D is enabled to counter such manipulation. Let's assume that device D and device X are both legitimate devices that may wish to discover and communicate with each other using Wi-Fi Aware. If device X has just been switched on, then device X will by default start with a NAN master preference 0 for at least 120 seconds. If other Wi-Fi Aware devices are present within vicinity of device X, it will discover them and join an existing NAN cluster. If device D operates within a NAN cluster C1 (either as cluster master or under synchronization control of another device operating as C1 cluster master), then device X will join the NAN cluster operated by device D, unless device X discovers another NAN cluster with higher cluster grade (as specified in Section 3.4.1 of Wi-Fi Aware spec). Similarly, if device X was operating within another NAN cluster C2 (either as cluster master or under synchronization control of another device operating as C1 cluster master) before moving in vicinity of device D or a malicious device M, then it will check if cluster C1 or a cluster operated by a malicious device has a higher cluster master grade than the cluster master of C2.

So, the malicious device M may try to operate a NAN cluster with a higher cluster grade than device D and X. In that case, device X will join device M's cluster at which point device D may (temporarily) lose track of device X (e.g. due to different discovery window timing and/or moves towards Non-Master Non-Sync state during which device X temporarily stops sending NAN synchronization frames). A malicious device could hence capture temporary discovery control of device X by deliberately sending e.g. discovery beacons or NAN synchronization frames with a very high master rank once it discovers that new device X has been switched on (e.g. after device X has sent its first NAN synchronization frame). Once device M has become the cluster master of device X, it may lead to moving device X to a Non-Master Non-Sync state in which device X will stop sending its own NAN synchronization beacon frames and in which it may enter longer sleep times, and hence make it more difficult for device D to discover device X. In case NAN device X makes use of proxy discovery, by registering its services to another device which enables service discovery of these services on behalf of device X, device X may go to sleep even for a longer time. If a malicious device M would act as proxy for device X it may disable the service discovery of device X's proxied services, and hence these may not be discovered by device D.

Device M may prevent a traditional device D from seeing the messages from device M in which device M claims a very high master rank. This could cause device D to join M's cluster (as specified in Section 3.4.2 of Wi-Fi Aware spec), which may not be desired by device M, at least temporarily until device M has taken synchronization control of device X. Possible ways in which device M may achieve this, are:

Deliberately causing interference during device D's discovery window or when device M sends discovery beacon;

Using (extreme) beamforming whilst device M communicates with device X;

Device M taking control of timing of device D by taking anchor master role and letting device M join its NAN cluster, and deliberately sending different timing information to device D and to X (e.g. using two different radios);

Device M may send NAN synchronization frame or discovery frame using device D's or device X's MAC address as destination address of such frame instead of broadcast address. It is not predictable what device X or device D might do (e.g. ignore those messages, if the broadcast address is not used, or accept/reject them based on matching the destination MAC address of the received frame with its own MAC address). This may likely lead to possible exploits on certain devices, given how the Wi-Fi software stack typically operates.

Given that the Timing Synchronization Function is driven by the anchor master of the NAN cluster, it also influences the Further Availability Windows (FAWs) used for data communication on a NAN Data Link/NAN Data Path. Once device M has synchronization control, this makes it easier to perform man-in-the-middle attacks. For example, it could make it easier to perform replay attacks, i.e. acting/responding on behalf of device X during the security association (e.g. 4-way handshake) when setting up a NAN data path connection. If device D and X send/listen during completely different intervals, and assuming that the devices sleep and do not actively listen during other intervals, they may not see each other's messages, and hence the replay counter may not function properly. For example, if device M impersonates device X, e.g. using same device name, publish the same services, (the user of) device D may not be aware it has selected to talk to the wrong device (as it may show up first or only once in the list of new devices in device D's user interface). If device D indeed wrongly selects to start the security association with device M, device M can act on behalf of device X, by "replaying" the messages received from device D and X during different time intervals. And hence even device X may not suspect anything wrong. Device M could deliberately fail the connection towards one device, force some retries, force data to be redirected, etc. It may also make use of possible confusion and e.g. by impersonating device D towards device X, request a non-secure data channel between device X and device M, and e.g. send malicious data (e.g. virus) to device X, without the user being suspicious as it was expecting an incoming connection from device D (e.g. after several failed attempts).

In an embodiment, device D may be enhanced to prevent discovering and connecting with a malicious device M instead of the intended legitimate device X in the following manner. First device D is arranged to find devices within wireless range of D, and presumably has found and discovered a set of other devices $X_0 \ldots X_n$. Then, upon or during establishing a data connection with device $X_i$ ($0 \le i \le n$), device D detects if a device $X_j$ ($0 \le j \le n$) is operating a different cluster ID or using different Discovery Window (DW) timing than device D and device $X_i$. To enable this, device D has to listen outside its own discovery window on the discovery channel (Wi-Fi channel 6 in 2.4 GHz band and/or Wi-Fi Channels 44 or 149 in 5 GHz band) and/or other channel for NAN synchronization frames and NAN discovery beacons, preferably continuously during a time interval starting several seconds before and after initiating the connection setup procedure with device Xi. Upon receiving such frames, device D has to inspect the value of the cluster ID attribute (e.g. the value of the A3 field of NAN synchronization and discovery beacon frames, or the value of the cluster ID field in the Cluster Discovery attribute) and the Timestamp attribute (in NAN synchronization and discovery beacon frames) and/or the time at which each of these frames was received by device D and compare it with the discovery window timing in which device D operates itself in relation to the cluster master of the cluster in which device D operates. It also needs to correlate it with the cluster ID and timestamp and/or receive timing of the NAN synchronization frames and NAN discovery beacons from all other devices different from device $X_j$.

A further embodiment is arranged to prevent false positives and not unnecessarily burden the user with warning messages or unnecessarily aborting the connection setup procedure in case not all NAN devices within range are part of the same cluster and no malicious device is present. The device D is arranged to determine whether device $X_j$ has one or more overlapping characteristics with device D or $X_j$. Only if $X_j$ has one or more overlapping characteristic with device D or Xi, device D shows a warning message to the user and/or aborts the connection sequence. Device D does not display a warning message or abort the connection setup procedure if none of the other discovered devices $X_k$ ($0 \leq j \leq n$, $k \neq i$) has at least one overlapping characteristic.

Overlapping characteristics may typically include one or more of the following:

- support for the same service (i.e. matching the same service ID) in NAN beacon frames or NAN service discovery frames.
- using the same MAC address or NAN Management Interface address in NAN beacon frames or NAN service discovery frames.
- using the same MAC address in the WLAN infrastructure attribute, P2P operation attribute, IBSS attribute, Mesh attribute.
- publishing the same service specific info (which may include e.g. friendly name of the device or service instance) in NAN service discovery frames, or significantly overlapping service specific info (e.g. using substring matching, synonym matching, approximate string matching).
- using the same service instance ID in NAN service discovery frames
- using the same vendor specific attributes in NAN service discovery frames.

The more characteristics show overlap, the higher the confidence level for device D that another device tries to impersonate an intended device. Optionally, in order to reduce the number of false positives, device D may use a threshold defining how many of these characteristics have overlap with device D or Xi, and only if this threshold is exceeded show a warning message to the user or abort the connection setup sequence, and if not, move the respective device to the set of trusted/excluded devices.

Also, device D may maintain a set of trusted devices $Y_0 \ldots Y_n$, to which $X_i$ is added if it has no overlapping characteristic with any of the other discovered devices. Similarly, a list of excluded devices may be maintained, e.g. based on substantial overlap or external trust data.

The assumed risk is that a man-in-the middle device M is very likely to announce support of the same service and/or the same friendly name towards the device it manipulates the discovery of (i.e. device Xi), otherwise device D would not set up a data connection to it, Malicious device M may also manipulate device Xi using forwarded and/or modified instructions from device D, since it could otherwise be noticeable by the user of device D if device Xi does not respond to any of its actions, and hence device M needs to support the same service.

To enable detecting such manipulation, device D may monitor NAN beacon frames (i.e. NAN synchronization frames and NAN discovery beacon frames) to identify these similar characteristics being received outside its own operating discovery window interval. In addition, device D listens for NAN service discovery frames. Even if device $X_i$ is under synchronization control of a malicious device M, it may occasionally send out a NAN service discovery frame to publish a service (either voluntarily or as a response to a NAN service discovery frame sent by device M), and hence device D may detect this frame. In order to identify support for the same service, device D needs to inspect the service ID field within the Service Descriptor Attribute in the service discovery frame received outside the discovery window and compare it with the service ID values received during its discovery window interval. Similarly, it should compare the Instance ID field to identify an overlapping service instance ID and compare the Service Info field and/or the vendor specific attribute within the Service Descriptor Attribute to verify if the same or significantly overlapping service specific info (such as a friendly name of the device or service instance) and/or vendor specific information is being used.

In a further embodiment, device D may show more emphatic or additional warning messages or popup dialogs (e.g. "are you sure you want to connect yes/no"), in the case more characteristics of $X_j$ have overlap with $X_i$ and/or when device $X_i$ or $X_j$ is operating as cluster master and/or when device $X_i$ or $X_j$ exposes services through proxy discovery.

In a further embodiment, device D may compare the discovered information with previously stored information about devices discovered during earlier encounters (e.g. before device M took synchronization control) and to which it had successfully connected (e.g. because the two devices know each other from earlier data exchange, e.g. phone of a friend). The comparison may include looking for possible overlap with one of the MAC addresses used in the NAN beacon or service discovery frames, the MAC address within the WLAN infrastructure attribute, P2P operation attribute, IBSS attribute, Mesh attribute, or using e.g. the same friendly name of the device or service instance.

Also, it may be determined if certain capabilities have changed, such as support for NAN ranging or much higher NAN master rank. If so, this information is used to further determine whether or not to show a warning message or abort a connection setup procedure in case Xi supports a much higher NAN master rank or does not support NAN ranging in comparison with information earlier stored about device Xi. Such a change may indicate a man-in-the-middle, as a malicious device M may likely use a very high master rank. Device M may wish to avoid taking part in NAN ranging procedure and so avoid having its physical distance determined and prevent showing the distance to the user of device D.

Optionally in an embodiment, the processor may be arranged to execute the security process including disconnecting an ongoing data connection based on changes. Device D may encounter a significant change with earlier stored information of device Xi based on higher level protocol exchanges (e.g. above IP layer), e.g. a common higher layer device identifier, after setting up a secure data connection with Xi. Also, in the case device D derives a device type from e.g. service specific info or previously stored information, it may access a database, e.g. to retrieve a list of capabilities for that particular device type, and then correlate it with device capabilities discovered through service discovery, and determine differences, e.g. check if ranging has been switched off.

In an exemplary embodiment of the security process activated after discovery of device $X_j$ operating a different cluster, device D may use the synchronization timing information and the NAN master rank of device $X_j$ to perform one of the following procedures:

a) Send a NAN service discovery frame or a NAN ranging request frame during N's discovery window and listen for additional devices to respond to those frames. Subsequently, the security process may verify if these additional devices have one or more overlapping characteristics with device N. This procedure may show that $X_j$ is impersonating one of these additional devices.

b) Send a NAN synchronization frame during $X_j$'s discovery window with the same or higher NAN master rank as device $X_j$ and a higher TSF timer value. This procedure may force devices currently under synchronization control of $X_j$ to do a cluster merge as specified in Section 3.4.2 of the Wi-Fi Aware spec, so that device D can discover these devices and get them under control of device D.

As a result, if additional devices are found based on their response messages, device D may:

show the additional discovered devices to the user, or
add them to the set $X_0 \ldots X_n$ for further evaluation according to the other security procedures, or
abort an ongoing connection setup procedure, or
break a current ongoing data connection, or display additional warning messages.

In a further embodiment, given the TSF of a detected NAN cluster master operating N, device D may wait until DW0 as defined in Section 3.3.2 of Wi-Fi Aware as the DW in which the lower 23 bits of the TSF are zero, to perform the operations a) or b) as mentioned above. Optionally, device D waits until the end of DW0 before initiating a connection setup or secure pairing step with device Xi for allowing time to process the incoming results according to the earlier described procedures.

In an alternative embodiment, device D waits until all devices within range have synchronized towards the same cluster master as used by device D, before initiating a connection setup or secure pairing step with device Xi. In yet another alternative embodiment, device D waits until a proxy discovery timeout related to the TSF of device $X_j$ has taken place before initiating a connection setup or secure pairing step with device $X_i$, to make sure any additional device which was sleeping for longer time period due to having registered its services for proxy discovery, has woken up and be able to send a NAN synchronization frame, NAN service discovery frame, NAN ranging request, NAN discovery beacon frame. If this would take too long, device D may show an additional warning message/popup dialog (e.g. informing the user that the waiting time for making sure all devices have woken up has not been reached yet).

In another alternative embodiment, device D monitors device $X_0 \ldots X_n$ for a certain time interval to detect if the discovery window timing of device $X_i$ or $X_j$ and/or cluster ID related to device $X_i$ or $X_j$ (e.g. as detected through the NAN Cluster ID in the A3 field of NAN synchronization and discovery beacon frames) is changing multiple times during the time interval, and perform one of the following actions if the number of times is above a certain maximum threshold value:

1) show a warning message (e.g. that it is unable to properly synchronize)

2) start a new time interval until the amount of changes are below a minimum threshold value before initiating a connection setup or secure pairing step with device X, or $X_j$.

3) cancel an ongoing secure connection setup with device $X_i$ or $X_j$.

In a further embodiment, whilst sending NAN service discovery frame during Xj's discovery window and listen for additional devices to respond as described by procedure a) above, device D may request applying the NAN ranging function, using Fine Timing Measurement (FTM) based distance measurement protocol as defined in IEEE802.11-2016, after which device D operates its NAN ranging component to measure the distance between D and the additional devices found. Device D further divides the devices (i.e. of $X_0 \ldots X_n$, and the additional devices found during $X_j$'s discovery window) into a set S of devices for which the distance can be determined through NAN ranging, and a set T of devices for which the distance cannot be determined. If in addition device D further supports one or more of the mitigation strategies to make sure the distance measurement can be trusted, such as using reference interval or credential exchange during FTM measurement or using movement detection. Subsequently, device D may allow setting up data connection with device X, without showing warning to the user or aborting the connection setup procedure if device $X_i$ is part of set S, and will show warning to the user or abort the connection setup procedure if device $X_i$ is part of set T. In a further embodiment, device D first determines whether the distance between device D and the device X, is smaller than a pre-determined distance A, before allowing device D to set up a data connection with device X, without showing warning to the user or aborting the connection setup procedure.

Figure 3:
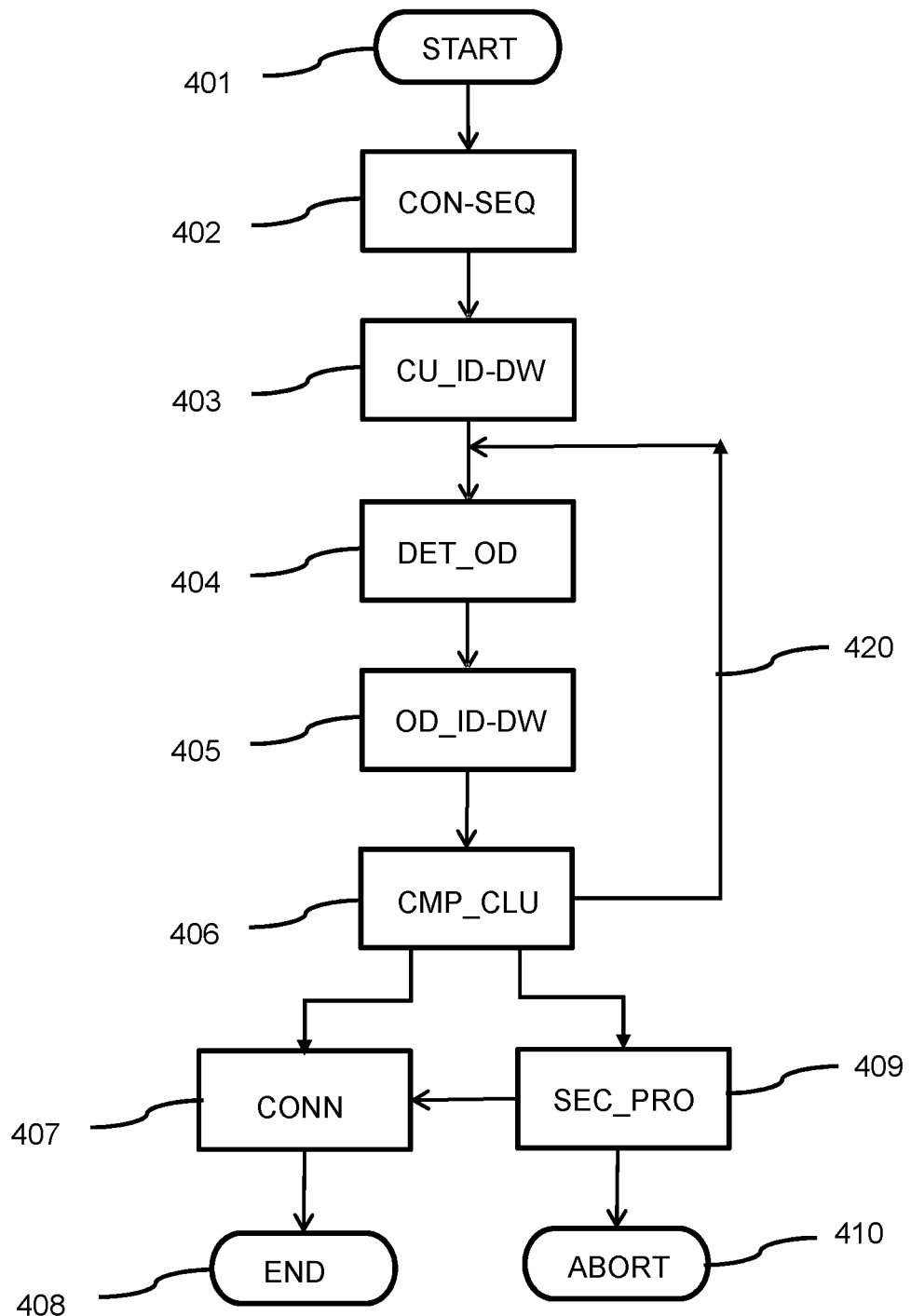
FIG. 3 shows a method for wireless communication between a device and other devices according to a communication protocol including a discovery protocol

FIG. 3 shows a method for wireless communication between a device and other devices according to a communication protocol including a discovery protocol. The method may be executed, for example, by circuitry and software in a processor in a stationary or mobile computing device. The communication protocol has been described above.

The method starts at node START 401. In a first stage CON_SEQ 402 executing a connection sequence is initiated to discover at least one other device within wireless range according to the discovery protocol and to connect to a discovered device for exchanging data. The connection sequence includes the following steps. In step CU_ID-DW 403 a current cluster identity and a current discovery window timing used by the current device is determined. In step DET_OD 404 at least one other device within wireless range is detected. It is noted that this step and the following steps are repeated for every detected device, as indicated by arrow 420. Upon detecting an other device, in step OD_ID-DW 405 a detected cluster identity and a detected discovery window timing of the detected other device are determined. Subsequently, in step CMP_CLU 406 it is detected whether the detected device is operating in a different cluster than the device by comparing the current cluster identity with the detected cluster identity or comparing the current discovery window timing with the detected discovery window timing. Next, upon detecting said different cluster, in step SEC_PRO a security process is executed. Furthermore, if no different cluster is detected, the connection sequence is resumed in step CONN 407 for connecting to a discovered other device for exchanging data, and the connection sequence normally terminates at node END 408.

The security process may, for example, display a warning, request a confirmation of the user, or may execute further security steps as elucidated earlier. If the security process confirms that the other device may be trusted for connection, the connection sequence is resumed in step CONN 407. However, if the security process determines that a detected device may not be trusted, the connection sequence is aborted in step ABORT 410.

In the security process, a distance measurement may be performed according to a ranging protocol between the device acting and a detected device. The devices are physically apart at a distance 140. The ranging protocol is for determining a distance between the devices as shown in FIG. 1 and is further described with reference to the FIGS. 1 and 2.

Many different ways of implementing the method are possible, as will be apparent to a person skilled in the art. For example, the order of the stages or steps can be varied or some stages may be executed in parallel. Moreover, in between steps other method steps may be inserted. The inserted steps may represent refinements of the method such as described herein or may be unrelated to the method.

Computer program products, downloadable from a network and/or stored on a computer-readable medium and/or microprocessor-executable medium, are provided that comprise program code instructions for implementing the above method, connection sequence, security process and further operations when executed on a computer device. So, the method according to the invention may be executed using software, which comprises instructions for causing a processor system to perform the respective method.

Typically, device D and other devices that interact to execute the connection sequence, each comprise a processor coupled to a memory containing appropriate software code stored at the devices; for example, that software may have been downloaded and/or stored in a corresponding memory, e.g., a volatile memory such as RAM or a non-volatile memory such as Flash (not shown). The devices may for example be equipped with microprocessors and memories (not shown). Alternatively, the devices may, in whole or in part, be implemented in programmable logic, e.g., as field-programmable gate array (FPGA). The devices and server may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method. It will be appreciated that the software may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 4A:
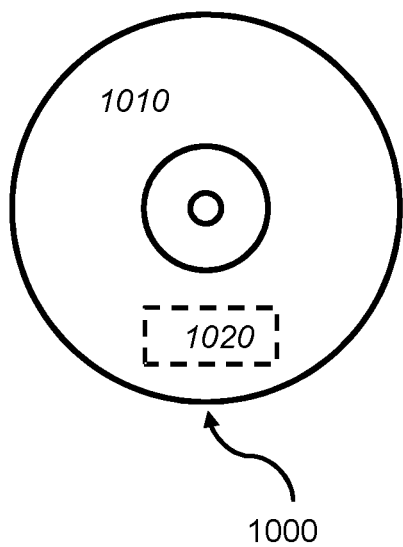
FIG. 4a shows a computer readable medium.

FIG. 4*a* shows a computer readable medium 1000 having a writable part 1010 comprising a computer program 1020, the computer program 1020 comprising instructions for causing a processor system to perform one or more of the above methods and processes in the system as described with reference to FIGS. 1-3. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 4B:
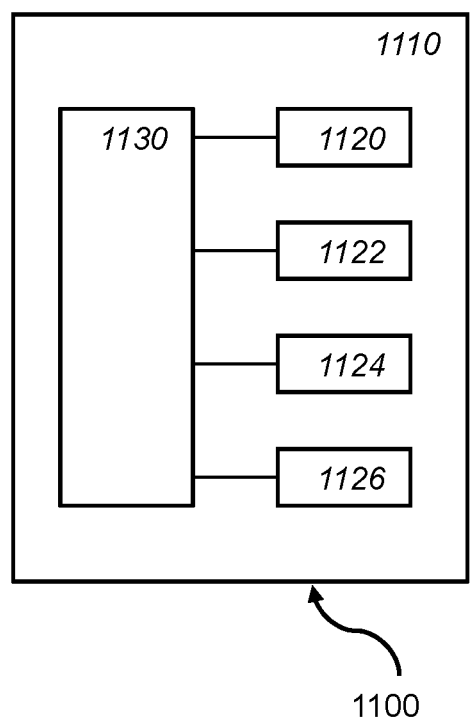
FIG. 4b shows in a schematic representation of a processor system.

FIG. 4*b* shows in a schematic representation of a processor system 1100 according to an embodiment of the device or server as described with reference to FIGS. 1-4*b*. The processor system may comprise a circuit 1110, for example one or more integrated circuits. The architecture of the circuit 1110 is schematically shown in the Figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for wired and/or wireless communication, using connectors and/or antennas, respectively.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the word 'comprising' does not exclude the presence of elements or steps other than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

In summary, a wireless communication system has a device arranged for wireless communication according to a communication protocol has a processor to execute a connection sequence according to a discovery protocol. The connection sequence comprises determining a current cluster identity and a current discovery window timing used by the device. Next, at least one other device within wireless range is detected, while further determining a detected cluster identity and a detected discovery window timing of the detected other device. Then it is detected whether the detected device is operating in a different cluster than the device by comparing the current cluster identity with the detected cluster identity or comparing the current discovery window timing with the detected discovery window timing. Finally, upon detecting said different cluster, a security process is executed, which may warn the user or abort the connection sequence. Thereby, a malicious device trying to manipulate the connection sequence is detected.

Reference documents:

[1] "Neighbor Awareness Networking, Technical Specification Version 2.0", published by Wi-Fi Alliance, dated 2017 Oct. 20

(also referred to as "NAN")

[2] IEEE 802.11-2016

IEEE Standard for Information technology

Telecommunications and information exchange between systems

Local and metropolitan area networks

Specific requirements

Part 11: Wireless LAN Medium Access Control (MAC) and Physical Layer (PHY) Specifications Chapter 10.24.6 Fine timing measurement procedure, pages 1773-1784

(also referred to as "FTM")

The invention claimed is:

1. A device arranged for wireless communication with other devices, the device comprising:
a transceiver for wireless communication according to a communication protocol including a discovery protocol,
a processor arranged to execute a connection sequence to discover at least one other device within wireless range according to the discovery protocol and to connect to a discovered device for exchanging data;
the communication protocol requiring that connected devices operate in a cluster, the cluster having a cluster identity and providing a discovery window at a respective discovery window timing;
the communication protocol defining a set of characteristics that each connected device may assign characteristic values;
the processor being arranged to execute the connection sequence comprising:
determining a current cluster identity of the cluster and a current discovery window timing used by the device,
determining the characteristic values of the device,
determining the characteristic values of additional devices in the cluster,
detecting at least one other device within wireless range,
establishing whether the detected other device has one or more overlapping characteristic values with at least one of: the device and the additional devices, and,
upon establishing that the detected other device has one or more overlapping characteristic values with at least one of: the device and the additional devices, executing a security process, wherein the security process comprises a decision whether to abort the connection sequence.

2. The device as claimed in claim 1 wherein the connection sequence further comprises:
determining a detected cluster identity and a detected discovery window timing of the detected other device, and
detecting whether the detected device is operating in a different cluster than the device by comparing the current cluster identity with the detected cluster identity or comparing the current discovery window timing with the detected discovery window timing.

3. The device as claimed in claim 1, wherein the processor is arranged to execute the security process comprising displaying a warning for the user of the device.

4. The device as claimed in claim 1, wherein the processor is arranged to execute the security process comprising:
requesting a user input representing a confirmation to continue connecting, and
upon receiving said confirmation, further executing the connection sequence.

5. The device as claimed in claim 1, wherein the cluster has a cluster master applying a cluster master rank, wherein the processor is arranged to detect whether the detected device is operating in a different cluster by:
detecting changes to the discovery timing or the cluster master rank, and
performing the security process if the number of changes during a predetermined period is above a predetermined threshold value.

6. The device as claimed in claim 1, wherein the processor is arranged to execute the security process comprising:
sending a discovery message during a detected discovery window using a synchronization timing of the detected other device,
receiving one or more discovery responses from one or more of the additional devices responding to the discovery message,
establishing whether the detected other device and the one or more additional devices have one or more overlapping characteristic values, and
upon establishing that said devices do not have overlapping characteristic values, to further execute the connection sequence.

7. The device as claimed in claim 1, wherein the cluster has a cluster master applying a cluster master rank, wherein the processor is arranged to execute the security process comprising:
sending a cluster synchronization message during a detected discovery window using a master rank that is same or higher than a detected master rank of the detected device and a synchronization timing that is higher than a detected synchronization time of the detected other device,
receiving one or more discovery responses from one or more of the additional devices, and
establishing whether the detected other device and the one or more additional devices have one or more overlapping characteristic values, and, upon establishing that said devices do not have overlapping characteristic values, further executing the connection sequence.

8. The device as claimed in claim 1, wherein the processor is arranged to execute the security process, upon establishing that said devices do have overlapping characteristic values, comprising at least one of:
   display a further warning and/or show the additional devices to the user;
   abort the current connection sequence;
   break an existing data connection to a device that has been connected earlier.

9. The device as claimed in claim 1, wherein the processor is arranged to execute the security process comprising, upon detecting the overlapping characteristic values, interrupting the connection sequence until the security process establishes compliance with at least one additional security criterion.

10. The device as claimed in claim 1, wherein the processor is arranged to execute the security process comprising at least one of:
    executing a distance measurement with the detected other device; or
    requesting an additional security step or authentication step; and
    signaling a higher layer application or service to provide security and further executing the connection sequence without additional security.

11. The device as claimed in claim 1, wherein the processor is arranged to execute the security process comprising:
    maintaining a set of trusted devices, and
    upon detecting that the detected other device is in the set of trusted devices, further executing the connection sequence.

12. The device as claimed in claim 11, wherein the processor is arranged to execute the security process comprising:
    establishing whether the detected other device has one or more overlapping characteristic values with any further devices in wireless range, and,
    upon establishing that the detected device does not have said overlapping characteristic values, adding the detected other device to the set of trusted devices.

13. The device as claimed in claim 11, wherein the processor is arranged to execute the security process comprising:
    establishing a number of overlapping characteristic values of the detected other device with any further devices in wireless range, and,
    upon establishing that the number of overlapping characteristic values does not exceed a predetermined threshold, adding the detected other device to the set of trusted devices.

14. A device arranged for wireless communication with other devices, the device comprising:
    a transceiver for wireless communication according to a communication protocol including a discovery protocol,
    a processor arranged to execute a connection sequence to discover at least one other device within wireless range according to the discovery protocol and to connect to a discovered device for exchanging data;
    the communication protocol requiring that connected devices operate in a cluster, the cluster having a cluster identity and providing a discovery window at a respective discovery window timing;
    the processor being arranged to execute the connection sequence comprising:
        determining a current cluster identity of the cluster,
        detecting at least one other device within wireless range,
    wherein the processor is arranged to detect whether the detected device is operating in a different cluster by:
        detecting changes to the discovery window timing, and
        if the number of changes during a predetermined period is above a predetermined threshold value, executing a security process, wherein the security process comprises a decision whether to abort the connection sequence.

15. A device arranged for wireless communication with other devices, the device comprising:
    a transceiver for wireless communication according to a communication protocol including a discovery protocol,
    a processor arranged to execute a connection sequence to discover at least one other device within wireless range according to the discovery protocol and to connect to a discovered device for exchanging data;
    the communication protocol requiring that connected devices operate in a cluster, the cluster having a cluster identity and a cluster master rank;
    the processor being arranged to execute the connection sequence comprising:
        determining the current cluster identity of the cluster,
        detecting at least one other device within wireless range,
    wherein the processor is arranged to detect whether the detected device is operating in a different cluster by detecting changes to the cluster master rank, and
        if the number of changes during a predetermined period is above a predetermined threshold value, executing a security process, wherein the security process comprises a decision whether to abort the connection sequence.

16. The device as claimed in claim 15, wherein the communication protocol defines a set of characteristic values and wherein each connected device may assign one or more characteristic values.

17. The device as claimed in claim 16, wherein the communication protocol corresponds to "Neighbor Awareness Networking, Technical Specification" (NAN) and wherein one or more of the characteristic values of the other device are included in at least one of: a NAN beacon frame and a NAN discovery frames.

18. A method for use in a device for wireless communication with other devices according to a communication protocol including a discovery protocol, the communication protocol requiring that connected devices operate in a respective cluster having a cluster master applying a master rank and a synchronization timing, the cluster having a cluster identity and providing a discovery window at a discovery window timing; the method comprising:
    executing a connection sequence to discover at least one other device within wireless range according to the discovery protocol and to connect to a discovered device for exchanging data;
    the connection sequence comprising:
        determining a current cluster identity and a current discovery window timing used by the device;
        detecting at least one other device within wireless range, and
    detecting if the other device is operating in a different cluster by detecting changes to the discovery timing or a cluster master rank, and
if the number of changes during a predetermined period is above a predetermined threshold value, executing a security process, wherein the security process comprises a decision whether or not to abort the connection sequence.

19. The method of claim 18 further comprising
determining a detected cluster identity and a detected discovery window timing of the detected other device, and
detecting whether the detected device is operating in a different cluster than the device by comparing the current cluster identity with the detected cluster identity or comparing the current discovery window timing with the detected discovery window timing, and, upon detecting said different cluster, executing the security process.

* * * * *